June 3, 1969  F. C. HANNON, JR  3,448,201
NADIR ELEVATION COMPUTER
Filed Oct. 12, 1967  Sheet 2 of 3

Francis C. Hannon, Jr.
INVENTOR.

BY Harvey A. David

ATTORNEYS

United States Patent Office 3,448,201
Patented June 3, 1969

3,448,201
NADIR ELEVATION COMPUTER
Francis C. Hannon, Jr., San Jose, Calif., assignor, by mesne assignments, to the United States of America as represented by the Secretary of the Navy
Filed Oct. 12, 1967, Ser. No. 674,991
Int. Cl. G09b 9/00
U.S. Cl. 35—10.4                6 Claims

ABSTRACT OF THE DISCLOSURE

A nadir elevation computer for use in association with an aircraft landmass radar simulator of the factored transparency type. The nadir elevation computer comprises means for effecting a nadir scan from a point on the transparency corresponding to a predetermined distance behind a simulated aircraft, forward through the nadir of the aircraft to a point corresponding to a predetermined distance ahead of the aircraft, summation means for converting the scanner output to an elevation signal having voltage levels corresponding to the profile of elevation levels represented by the transparency and traversed by the scan, voltage comparator means, logic means, memory means, and digital computer means cooperative to provide by interpolation, a value for the terrain elevation below the aircraft at the time the scan passes through the point of nadir.

Background of the invention

Existing radar landmass simulators for flight trainers comprise a special type of analog computer utilizing the black and white factored transparency technique to store reflectivity and terrain elevation data. The information is stored on the transparency by varying the density of the photographic emulsion, retrieval is achieved by using the transparency to modulate a light beam from a magnetically deflected flying spot scanner (cathode ray tube) directed into a phototube. A typical radar landmass simulator uses two transparencies, an elevation transparency which is a contour map with 29 density levels with each level representing a discrete elevation, and a reflectivity transparency with 11 density levels with each representing a discrete reflectivity coefficient. The scanning of these transparency maps simulates the scanning given a real terrain by a moving radar antenna. The scanning pattern is a pie shaped segment resulting from deflecting the beam from the location of the aircraft in the direction the antenna is pointing at that instant. Processing the information from these two transparencies yields the simulated radar display.

In addition to the radar display a flight trainer requires a radio altimeter read-out which continuously displays the height of the aircraft above terrain, i.e., altitude minus nadir elevation (nadir elevation is elevation of terrain under the aircraft). Nadir elevation is inherent in the data stored on the elevation transparency, unfortunately retrieving it has proven to be a problem. The magnetic deflection circuits used to deflect the flying spot scanner beam have a definite starting transient that requires a period of time before the spot stabilizes. During the transient period the spot has to be blanked out, resulting in loss of the nadir elevation data and the short range elevation data.

In previous landmass simulators, nadir elevation information was derived by sampling and holding the elevation signal when the azimuth antenna was coincident with the aircraft's boresight. There are four major disadvantages in this method. First, this technique does not account for any aircraft movement between sample times. Second, the real-world terrain is better approximated by a continuous waveform than by discrete steps as would be generated using sample-and-hold circuits. Third, there is no provision for decision-making based on knowledge of the terrain in front and behind the aircraft. Finally, the sample-and-hold technique of nadir elevation mechanization is limited in uniquely determining and assigning an absolute value to a signal that can vary, in the worst case, 22% across the film plate transparency. This variation is due to the inability of film plate manufacturers to accurately control short light exposures on photosensitive emulsion.

Summary of the invention

With the foregoing in mind, it is a primary object of the present invention to provide, in a radar landmass simulator, improved means for retrieving nadir elevation data from the elevation transparency.

Another object of the invention is the provision of means for deriving nadir elevation data independently of the gathering of data by the usual sweep of a transparency segment for creating the simulated radar display.

As another object this invention aims to accomplish the foregoing through the provision of means for generating a separate nadir sweep, once each antenna cycle, which scans the elevation transparency from a point behind the aircraft, through the nadir to a point ahead of the aircraft to generate a series of pulses corresponding to elevation level changes, and computing therefrom an elevation function from which the nadir elevation is derived.

Brief description of the drawings

Other objects and advantages of the invention will become apparent from the following detailed description of a preferred embodiment thereof when read in conjunction with the accompanying sheets of drawings forming a part of this specification, and in which.

Description of the preferred embodiment

Figure 1:
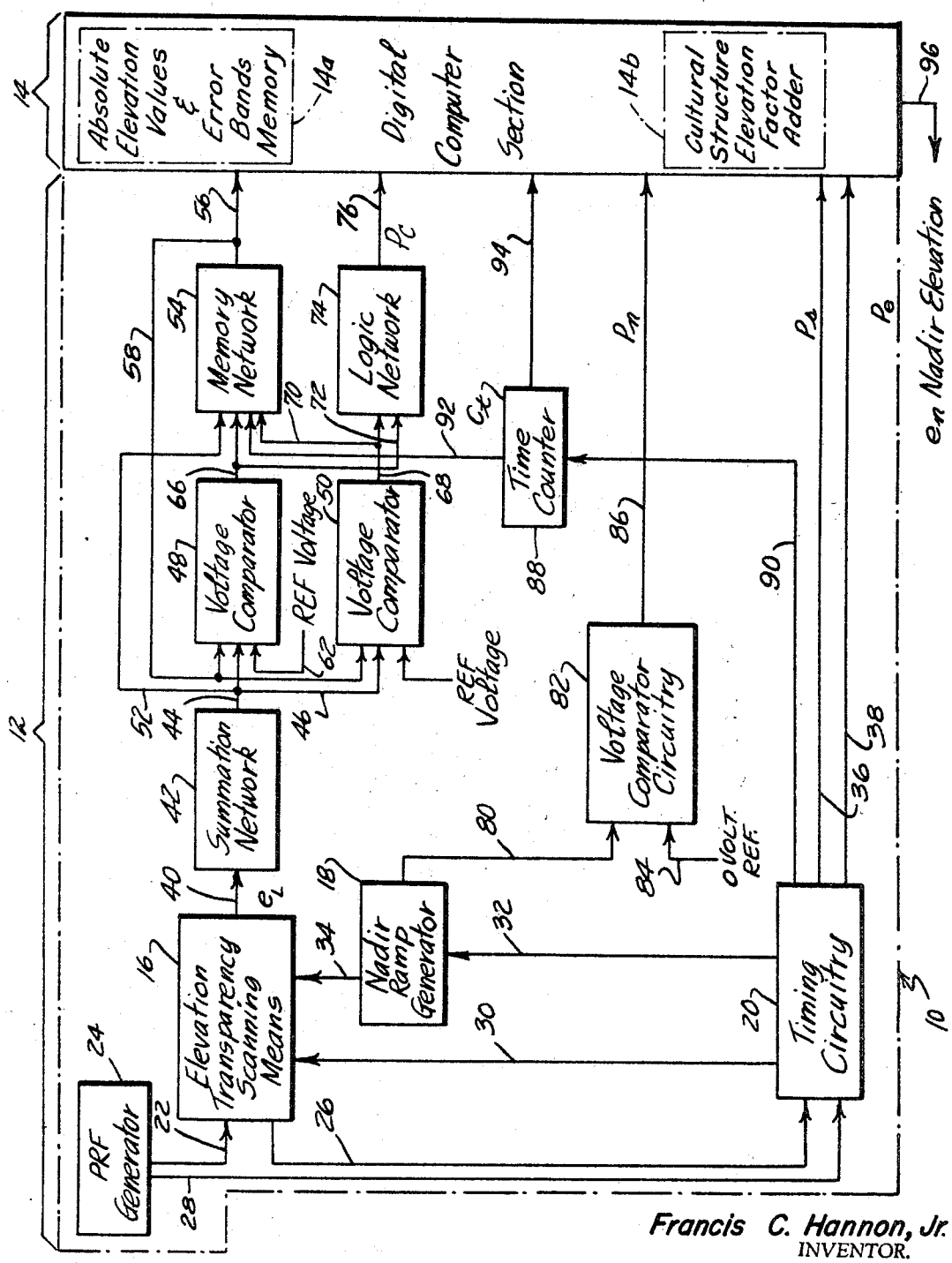
FIG. 1 is a block diagram functionally illustrating a nadir elevation computer embodying the present invention.

In the form of the invention illustrated in FIG. 1 and described hereinafter, there is provided a nadir elevation computer, generally indicated at 10 and comprising an analog computer section 12 and a digital computer section 14. The analog section may be considered to include an elevation transparency scanning means 16, a nadir elevation ramp generator 18, a timing network 20, and other components or networks which will later be described more fully.

The scanning means 16, which also forms part of the analog section of the landmass radar simulator in which the invention is incorporated, is normally driven in response to signals via line 22 from a pulse repetition frequency generator 24 to provide antenna simulating scan of the elevation transparency.

The scanning means 16 normally comprises a flying spot scanner tube, the spot of which sweeps a pie shaped segment of the elevation transparency to simulate antenna scan and photomultiplier tube means which provides an elevation data signal which is processed together with other data signals, e.g., a reflectance data signal, to provide a radar display simulation, all as typified by the landmass radar simulators described in U.S. Patents Nos. 3,113,989 and 3,291,884. During the time that the antenna reverses direction at the end of each azimuth scan, a slow speed nadir elevation sweep is generated in the flying spot scanner tube of the scanning means 16. Thus, the timing network 20 is responsive to end of antenna sweep signals from the scanning means 16 via line 26 and timing signals from the pulse repetition frequency generator 24 via line 28 and provides to the elevation transparency scanning means 16, via suitable conductor means indicated by flow line 30, a nadir inhibit gate signal which is used to blank the normal flying spot scanner sweep during the period when nadir elevation $e_n$ is to be determined. The nadir elevation ramp generator 18, which is responsive to main gate signals from the timing network 20 via line 32, provides suitable sweep signals via line 34 to cause the flying spot scanning tube to initiate the desired independent sweep somewhat behind the aircraft and following the course thereof.

After the nadir sweep is initiated and stabilized, a start pulse $P_s$ is generated at a time when the scanner spot is at a predetermined distance, say eight miles, behind the aircraft. This start pulse $P_s$, which is transmitted from the timing network 20 to the digital portion 14 via line 36, is indicated in the set time based on curves illustrated in FIG. 2, and particularly on the curve (a) thereof.

As the nadir sweep progresses from the time of the start pulse $P_s$, the scanner means 16 provides on line 40 an output voltage signal, which signal assumes different voltage levels as a function of time of sweep and corresponding to different gray levels or densities of emulsion representing terrain elevations $e$ on the transparency being scanned. These voltage levels are therefore representative of the terrain elevations $e$ represented by the elevation profile curve (b) of FIG. 2 wherein $e_{L3}$ is the third last elevation level before the level $e_P$ present at the time of nadir, $e_{L2}$ is the second last elevation level before the level $e_P$, $e_{L1}$ is the elevation level just preceding $e_P$, $e_{N1}$ is the next level following $e_P$, $e_{N2}$ is the second level following $e_P$, and so on until the period of scan is terminated by an end of scan pulse $P_e$ as shown on curve (c) of FIG. 2. The pulse $P_e$ is conveyed from the timing network 20 to the digital portion 14 as indicated by line 38, when the nadir sweep has moved forward of the aircraft predetermined distance, again in this example eight miles.

The elevation signals via line 40 from the elevation transparency scanning means 16 are processed by summation means 42 to provide voltage signals corresponding to the elevation profile of curve (b). These signals are conveyed on lines 44 and 46 to complementary voltage comparators 48, 50, and on line 52 to a memory network 54. The latter provides terrain elevation data to the digital portion 14 via line 56, and also back to the voltage comparators 48, 50 by lines 58, 60.

Figure 2:
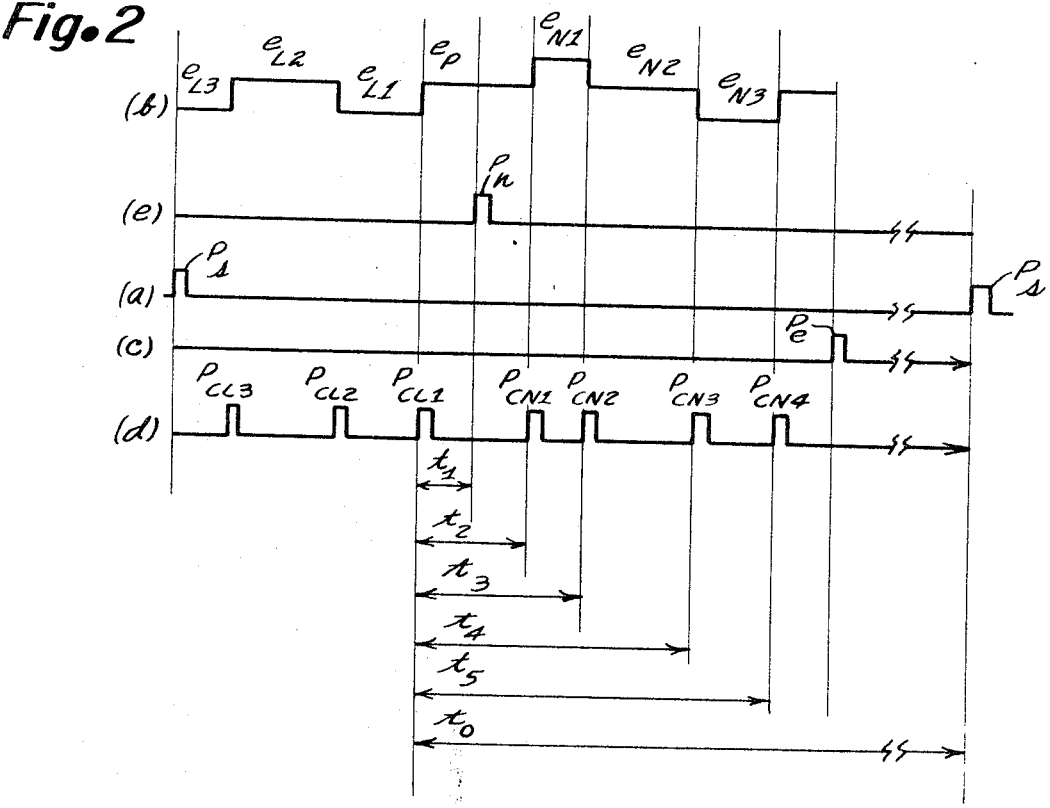
FIG. 2 is a set of curves illustrating the time relation of certain signals and pulses generated in the nadir elevation computer of FIG. 1.

The complementary comparators 48, 50 each compare the changing elevation profile signals from the summation network 42 and nadir terrain elevation from the memory network 54 with a reference voltage input 62, 64. When the two elevation input signals exceed the reference voltage signal in ether comparator, the comparator changes state and produces a predetermined voltage pulse. This pulse, from either comparator, is fed via lines 66, 68, 70 to the memory network 54 to update the memory and the data supplied via line 56 to the digital computer section as the aircraft flies along its course. The output pulses from the comparators 48, 50 are also applied via lines 66, 68, and 72 to a logic network 74 which, upon each elevation change, produces an elevation change pulse $P_C$ conveyed on line 76 to the digital portion 14. The change pulses $P_C$, represented on curve (d) of FIG. 2, are used as timing pulses in the computation of the nadir elevation in the digital portion as will presently be made apparent.

The nadir ramp generator 18 provides a nadir scan ramp signal via line 80 to voltage comparator circuitry 82 where the signal is compared with a zero reference voltage, indicated as an input at 84. When the nadir scan ramp signal exceeds the reference voltage, the comparator 82 changes state and provides a time of nadir pulse $P_n$ via line 86 to the digital computer section 14. The time of nadir pulse $P_n$ is indicated on curve (e) of FIG. 2.

To determine the nadir elevation, using equations of trigonometry, it is necessary to have knowledge only of those discontinuities immediately in front of and behind the aircraft. However, referring to curve (b) of FIG. 2, it is evident that, in scanning typical terrain for several miles, there will be many elevation changes throughout the sweep. It is the purpose of the digital computer section 14 to select and direct the storage of the appropriate elevation and time words in the correct memory locations.

At the beginning of a new scan, there is the associated start pulse $P_s$. $P_s$ is an instruction for the digital section 14 to reference all elevation and time memory locations to zero and then to read the terrain elevation analog signal, $e_{L3}$ (see curve (b), FIG. 2), and to store it in the memory location reserved in the memory network for the last elevation, $e_{L1}$, prior to nadir, and in the location for present elevation as the present elevation, $e_P$. As the sweep progresses, pulse $P_{CL2}$ directs the transfer of elevation data $e_{L3}$, stored at the location for $e_P$, to location $e_{L1}$ and the newly acquired elevation $e_{L2}$ to be stored in the location $e_P$. As the hypothetical sweep moves along the boresight of the airplane, it encounters an elevation transition from $e_{L2}$ to $e_{L1}$. Thus is generated change pulse $P_{CL2}$. Pulse $P_{CL2}$ directs the transfer of elevation data $e_{L2}$, stored at location $e_P$, to location $e_{L1}$ and the newly acquired elevation $e_{L1}$ to be stored in location $e_P$. Change pulse $P_{CL1}$ is generated at the transition of the terarin profile from $e_{L1}$ to $e_P$ of FIG. 2. $P_{CL1}$ directs the transfer of elevation data $e_{L1}$, stored at location $e_P$, to location $e_{L1}$, and the newly acquired elevation $e_P$, to be stored at $e_P$.

Now, with $e_{L1}$ stored in memory location $e_{L1}$, and $e_P$ stored in memory location $e_P$, the next pulse in time $P_n$, which is the time of nadir pulse of curve (e) in FIG. 2, is used to "freeze" these memory locations. A timing counter 88 is driven via line 90 from the timing circuitry 20 and provides time counts to the memory network 54 and the digital section 14 as shown by lines 92 and 94. At every change pulse prior to nadir time, the time counter 88 is reset to zero. However, when a $P_n$ is encountered, the time is read out of the counter and stored in memory location $t_1$, the time $t_1$ being indicated in FIG. 2. To direct the elevations $e_{N1}$, $e_{N2}$, and $e_{N3}$ and the corresponding time words for $t_2$, $t_3$, and $t_4$ into proper memory locations after nadir time, the analog elevation signal and the time counter are interrogated with each change pulse, and the results stored sequentially in memory locations $e_{N1}$, $t_2$; $e_{N2}$, $t_3$; etc.

The terrain elevation and the time words which are now in memory must be transformed to the proper form for use as computation variables in the nadir equations. These transformations are accomplished in appropriately programmed portions of the digital computer section 14 using conventional techniques. More specifically, the elevation data words stored in memory network 54, which are a function of emulsion density on the film plate, are converted to elevation words in units of feet. This is accomplished by storing in memory the elevation (feet) values associated with each density level for a particular contour map from which the transparency was factored.

Because emulsion densities are difficult to control in making the elevation transparencies corresponding to a contour map, the resulting signal may vary as much as 22% for a given elevation across the film plate transparency. Accordingly, in the preferred embodiment of the invention, the section of the digital computer performing the transformation of elevation data to units of feet assigns absolute elevation values to the elevation words originally stored in memory. This original or unconditioned data is a function of film density and, as has been stated, is not constant for like elevations across the transparency. To overcome this defect and to regain accuracy, there is stored in memory a complete table 14a of each absolute density value and its allowable deviation. Each memorized elevation word is compared to the values stored in this table and assigned the absolute value of the density level in whichever error band it falls.

The digital computer section 14 is programmed to read out the memorized time words and to convert them to distance by multiplying the time, as between change pulses, by the velocity of the nadir scan. The digital section then utilizes the elevation and distance information to mathematically solve, by a conventional interpolation routine, for the elevation at the time of nadir. In addition, the digital section performs a continuous updating between nadir scans by utilizing the time of nadir and the velocity of the aircraft being simulated to synthetically fly the aircraft across the elevation profile stored in memory. The resulting output nadir elevation function is indicated in FIG. 1 by flow line 96.

Figure 3:
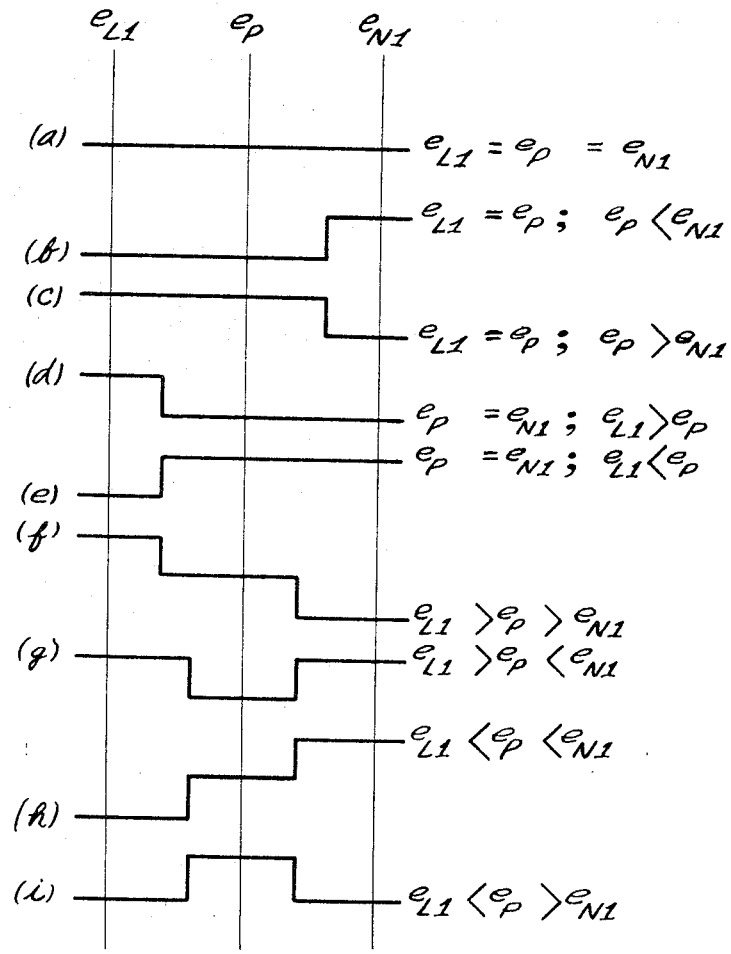
FIG. 3 is a set of curves representing nine different possible cases of elevation change in a typical elevation profile.

The interpolation routine is based on nine possible elevation profiles which are illustrated in FIG. 3 as curves (a)—(i). These profiles are for the last elevetion $e_{L1}$ prior to the present elevation, the present elevation $e_P$, and the next future elevation $e_{N1}$.

Figure 4:
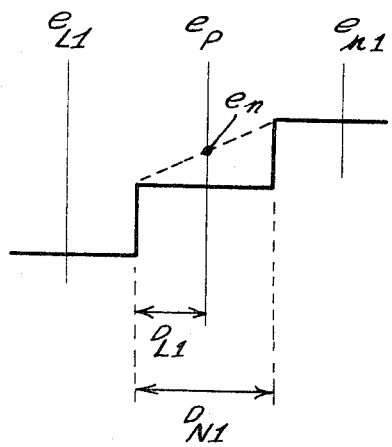
FIG. 4 illustrates the interpolation of one of the cases of FIG. 3 to determine nadir elevation.

Taking the case of FIG. 3 (h), wherein $e_{L1} < e_P < e_{N1}$, it will be evident from inspection of FIG. 4 that $$e_n = e_P + \frac{D_{L1}}{D_{N1}} (e_{N1} - e_P)$$

where $D_{L1}$ is the distance from the last elevation change prior to nadir to the point of nadir, and $D_{N1}$ is the distance from the last change prior to nadir to the next change after nadir, as is shown in FIG. 4. Thus, if the elevation $e_P = 5,000$ feet, elevation $e_{N1} = 5,200$ feet, $D_{L1} =$ one mile, and $D_{N1} =$ two miles, then:

$$e_n = 5,000 + \frac{1}{2}(5,200 - 5,000)$$

or $e_n = 5,100$ feet. The equations for interpolation of $e_n$ for the remaining situations shown in FIG. 3 will be evident upon inspection thereof by those skilled in the art to which the invention pertains.

The invention contemplates the addition, in the digital section 14b, of a constant elevation to the nadir elevation when a cultural target is coincident with the nadir point.

What is claimed is:

1. In an aircraft landmass radar simulator including a factored transparency having terrain elevation data stored thereon in the form of areas of different gray levels, each of which is representative of a predetermined terrain elevation, and scanning means of the type including flying spot scanner and photomultiplier means for providing an output signal which is a function of the densities of the gray areas, an improved nadir elevation computer comprising:
   ramp generator and timing means for causing said scanning means to effect a nadir scan from a point on the transparency corresponding to a predetermined distance behind a simulated aircraft, forward through the nadir of the aircraft to a point coresponding to a predetermined distance ahead of the aircraft;
   summation means for converting the scanner output to an elevation signal having levels corresponding to the profile of elevation levels represented by the transparency and traversed by the nadir scan;
   first voltage comparator means and logic means responsive to changes in said elevation signal to provide a change pulse upon each occurrence of elevation signal level change;
   memory means responsive to said elevation signal to store said elevation profile as a series of elevation words, and responsive to each change pulse before nadir to shift the series to adjacent memory locations whereby a first predetermined memory location is always occupied by the last elevation word before time of nadir, and a second predetermined memory locaton is always occupied by the presently existing elevation word;
   second voltage comparator means responsive to the output of said ramp generator and a reference voltage to produce a time of nadir pulse when said nadir sweep passes through nadir;
   said memory means being responsive to said time of nadir pulse to freeze the elevation words then in storage for a predetermined period and to store the next elevation word in a third predetermined memory location; and
   digital computer means for processing the elevation words in said first, second, and third memory locations by mathematical interpolation to provide a value for the elevation at the time the scan passes through nadir.

2. In a radar simulator, a nadir elevation computer as defined in claim 1, and wherein:
   said first voltage comparator means comprises a pair of complementary comparators connected to provide a change pulse from one or the other depending upon direction of change of the elevation signal input.

3. In a radar simulator, a nadir elevation computer as defined in claim 1, and wherein:
   said timing means is responsive to an end of antenna sweep signal to initiate said nadir sweep.

4. In a radar simulator, a nadir elevation computer as defined in claim 3, and wherein:
   said first voltage comparator means comprises a pair of complementary comparators connected to provide a change pulse from one or the other depending upon direction of change of the elevation signal input.

5. In a radar simulator, a nadir elevation computer as defined in claim 4, and comprising:
   second memory means in said digital computer means for memorizing an absolute elevation value and error band for each of said gray levels;
   said digital computer cooperating with the first mentioned memory means to compare the elevation levels from said summation network with the elevation values in said second memory means and to assign an absolute elevation value to each of said elevation words stored in said first, second, and third memory locations for use in computation of said nadir elevation.

6. In a radar simulator, a nadir elevation computer as defined in claim 5, and comprising:
   means within said digital computer for adding to said nadir elevation a predetermined elevation factor when said nadir is coincident with a cultural structure.

References Cited

UNITED STATES PATENTS 3,355,538   11/1967   Thomas et al. _____ 35—10.4

RICHARD A. FARLEY, *Primary Examiner.*

T. H. TUBBESING, *Assistant Examiner.*